United States Patent
Vasseur et al.

(10) Patent No.: US 11,979,311 B2
(45) Date of Patent: May 7, 2024

(54) USER-ASSISTED TRAINING DATA DENOISING FOR PREDICTIVE SYSTEMS

(71) Applicant: Cisco Technology, Inc., San Jose, CA (US)

(72) Inventors: Jean-Philippe Vasseur, Saint Martin d'Uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 332 days.

(21) Appl. No.: 17/547,718

(22) Filed: Dec. 10, 2021

(65) Prior Publication Data
US 2023/0188455 A1    Jun. 15, 2023

(51) Int. Cl.
*H04L 45/00* (2022.01)
*H04L 41/5025* (2022.01)
*H04L 43/0852* (2022.01)
*H04L 45/02* (2022.01)

(52) U.S. Cl.
CPC .......... *H04L 45/08* (2013.01); *H04L 41/5025* (2013.01); *H04L 43/0852* (2013.01)

(58) Field of Classification Search
CPC ... H04L 45/08; H04L 41/5025; H04L 41/149; H04L 41/142; H04L 41/147; H04L 41/16; H04L 41/5009; H04L 41/5019; H04L 43/0852; H04L 43/022; H04L 43/028; H04L 43/08
See application file for complete search history.

(56) References Cited

U.S. PATENT DOCUMENTS

| | | | |
|---|---|---|---|
| 8,983,844 B1 * | 3/2015 | Thomas | G10L 15/20 704/226 |
| 9,439,081 B1 | 9/2016 | Knebl et al. | |
| 10,212,493 B2 * | 2/2019 | Chai | H04Q 9/00 |
| 10,580,430 B2 | 3/2020 | Jain et al. | |

(Continued)

FOREIGN PATENT DOCUMENTS

| | | |
|---|---|---|
| CN | 111046824 A | 4/2020 |
| CN | 112115131 A | 12/2020 |

OTHER PUBLICATIONS

Shan Mangna et al., "Prediction and analysis of telemetry data based on LSTM network;, 2019, IEEE 2019 International Conference on Computer Network, electronic and automation (ICCNEA)" (Year: 2019).*

(Continued)

*Primary Examiner* — Rasheed Gidado
(74) *Attorney, Agent, or Firm* — BEHMKE INNOVATION GROUP LLC; James M. Behmke; James J. Wong

(57) ABSTRACT

In one embodiment, a device receives, via a user interface, an indication of what is considered noise within a time series of a path performance metric. The device selects, based on the indication, a particular denoising filter to be applied to telemetry data obtained from one or more network paths regarding the path performance metric. The device forms model training data by applying the particular denoising filter to telemetry data obtained from one or more network paths regarding the path performance metric. The device trains, using the model training data, a prediction model to predict when a given network path will experience a failure condition.

20 Claims, 11 Drawing Sheets

(56) References Cited

U.S. PATENT DOCUMENTS

| | | | |
|---|---|---|---|
| 11,303,448 B2* | 4/2022 | Schiatti | G06N 20/00 |
| 2005/0265629 A1* | 12/2005 | Fu | G06F 18/00 |
| | | | 382/265 |
| 2021/0271957 A1 | 9/2021 | Lee et al. | |

OTHER PUBLICATIONS

Khalid, et al., "FAdeML: Understanding the Impact of Pre-Processing Noise Filtering on Adversarial Machine Learning", online: https://arxiv.org/pdf/1811.01444.pdf, Nov. 4, 2018, accesssed Dec. 8, 2021, 7 pages, arXiv.org.

Al-Gethami, et al., "Empirical Evaluation of Noise Influence on Supervised Machine Learning Algorithms Using Intrusion Detection Datasets", Research Article, Security and Communication Networks, vol. 2021, Article ID 8836057, 28 pages, Wiley | Hindawi.

* cited by examiner

USER-ASSISTED TRAINING DATA DENOISING FOR PREDICTIVE SYSTEMS

TECHNICAL FIELD

The present disclosure relates generally to computer networks, and, more particularly, to user-assisted training data denoising for predictive systems.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, the quality of such a prediction model will greatly depend on the quality of the data on which it is trained. Various sources of noise, ranging from bugs to even sporadic phenomenon, can greatly diminish the predictive power of a prediction model, which can lead to needlessly rerouting the traffic and affecting the user experience or not predicting a failure, which can also impact the user experience.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
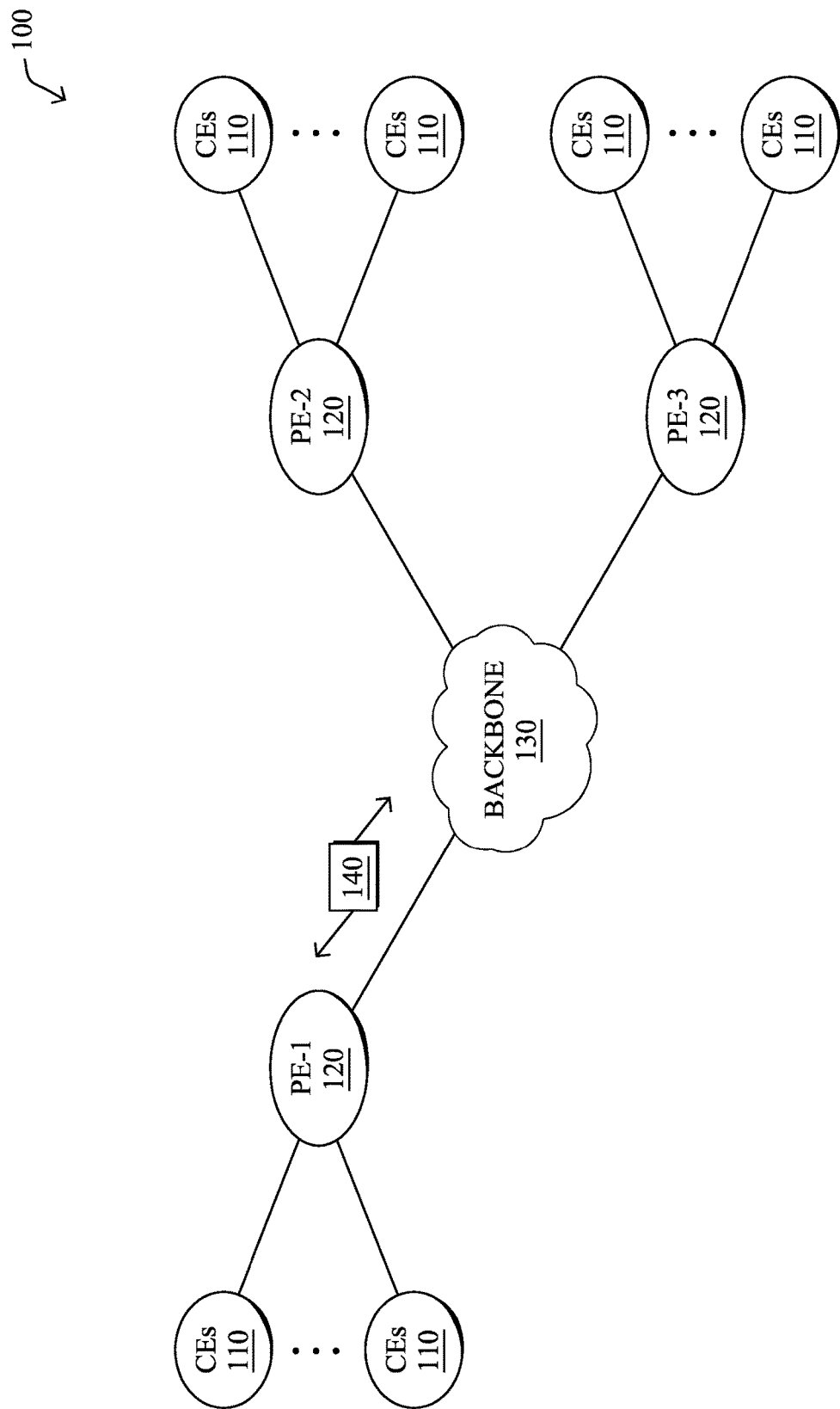
FIGS. 1A-1B illustrate an example communication network.

According to one or more embodiments of the disclosure, a device receives, via a user interface, an indication of what is considered noise within a time series of a path performance metric. The device selects, based on the indication, a particular denoising filter to be applied to telemetry data obtained from one or more network paths regarding the path performance metric. The device forms model training data by applying the particular denoising filter to telemetry data obtained from one or more network paths regarding the path performance metric. The device trains, using the model training data, a prediction model to predict when a given network path will experience a failure condition.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
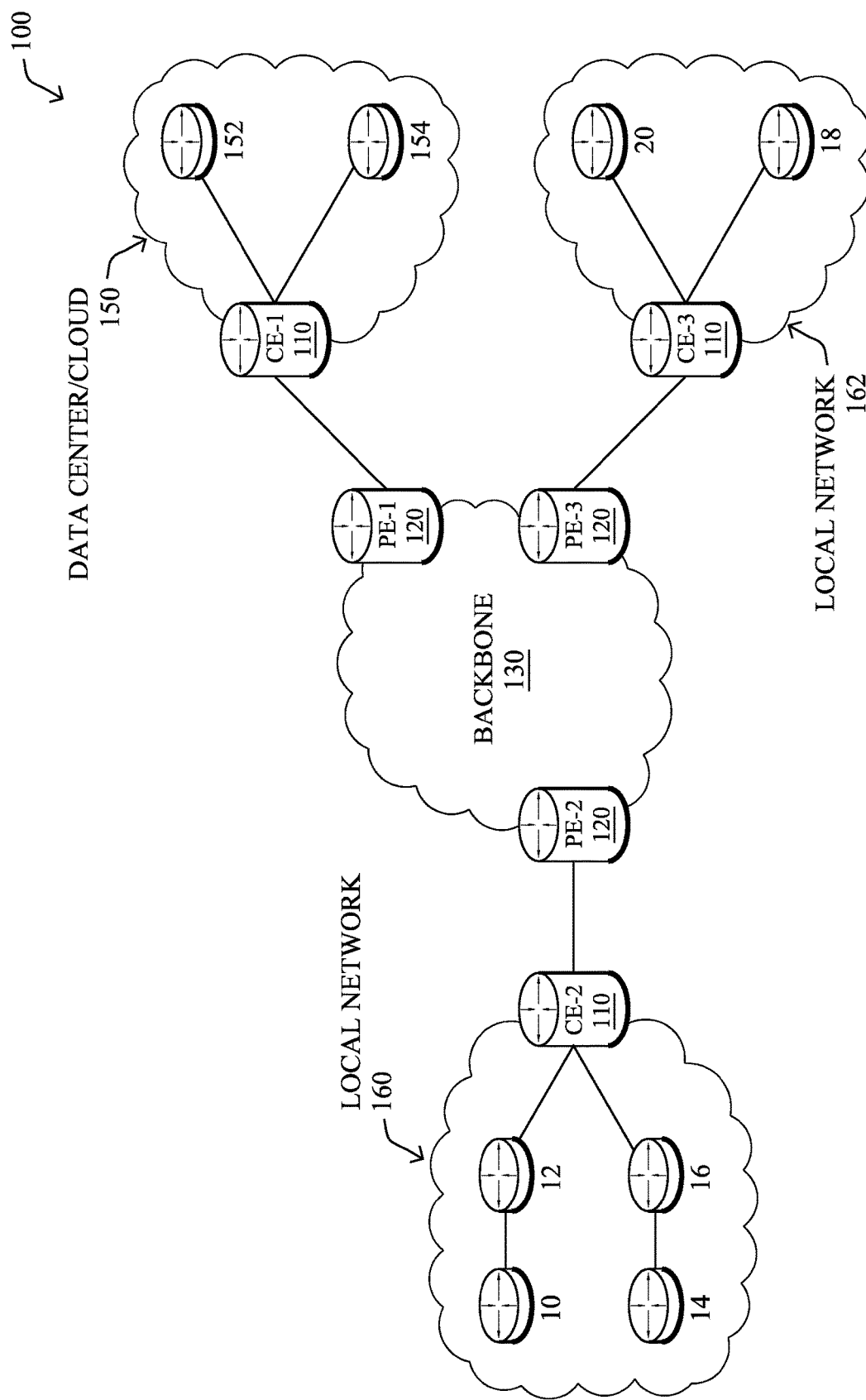

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
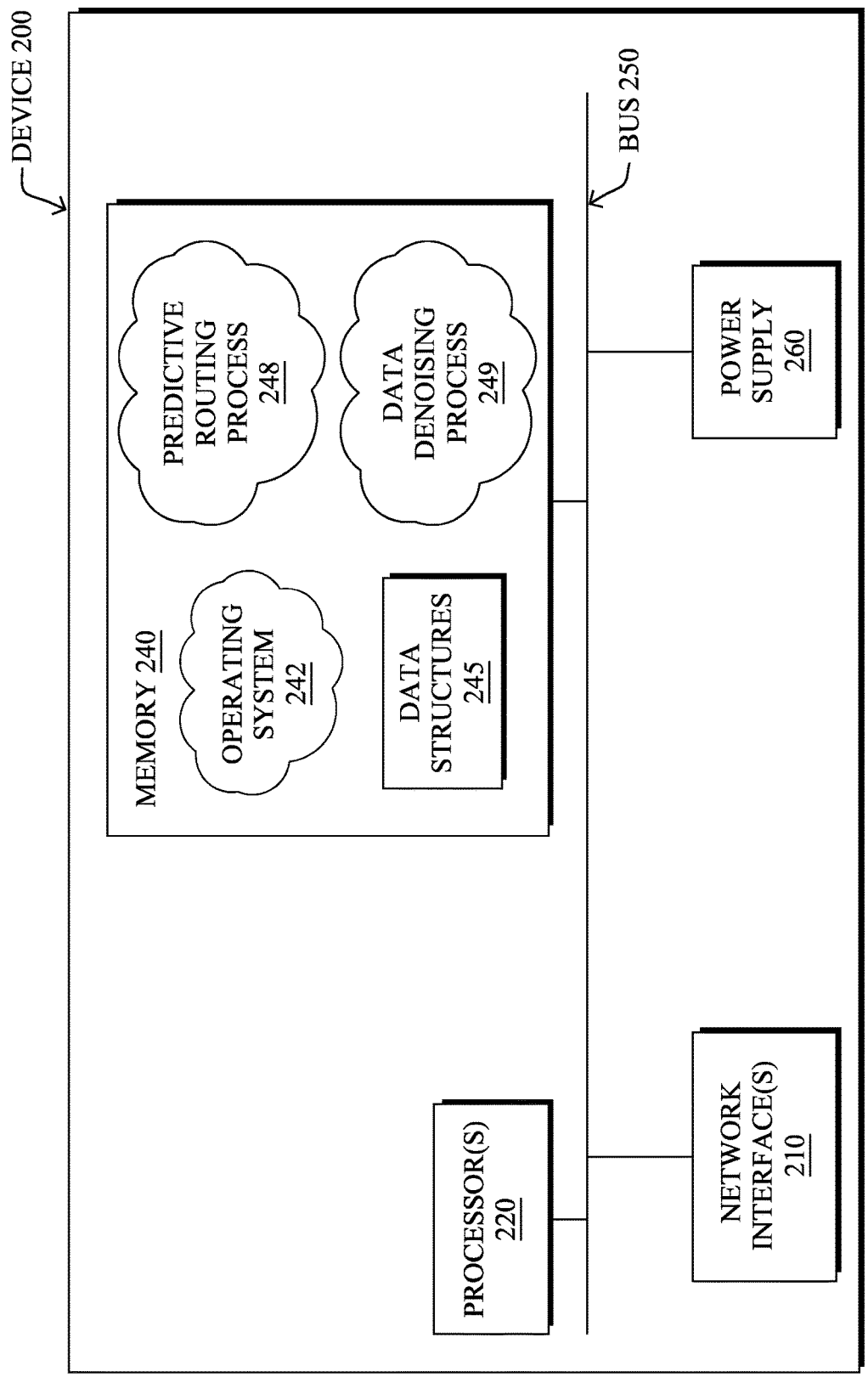
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a data denoising process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or data denoising process 249 contain computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 and/or data denoising process 249 may include computer executable instructions that, when executed by processor(s) 220, cause device 200 to perform the techniques described herein. To do so, in some embodiments, predictive routing process 248 and/or data denoising process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or data denoising process may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or data denoising process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
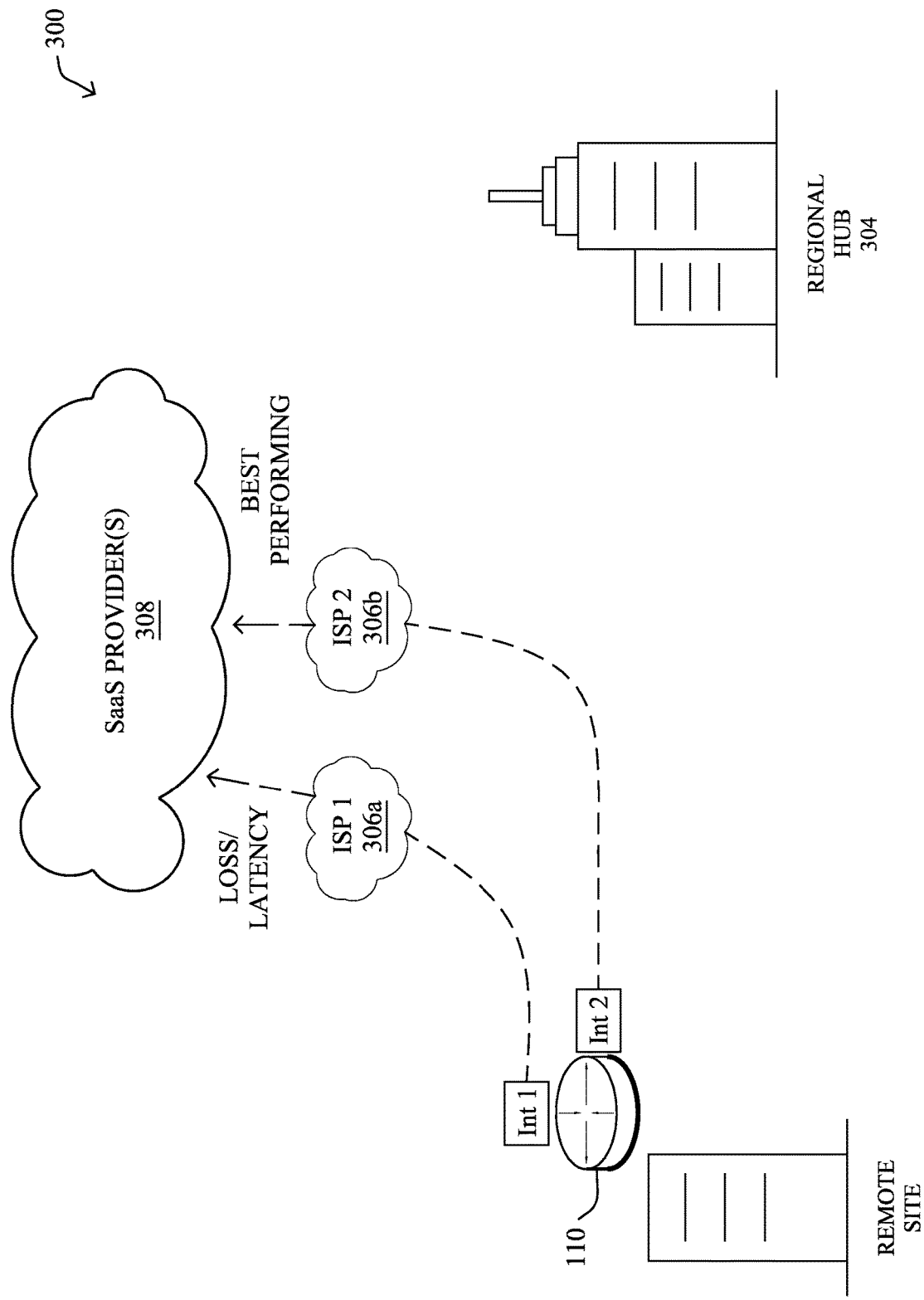
FIGS. 3A-3B illustrate example network deployments.
Figure 3B:
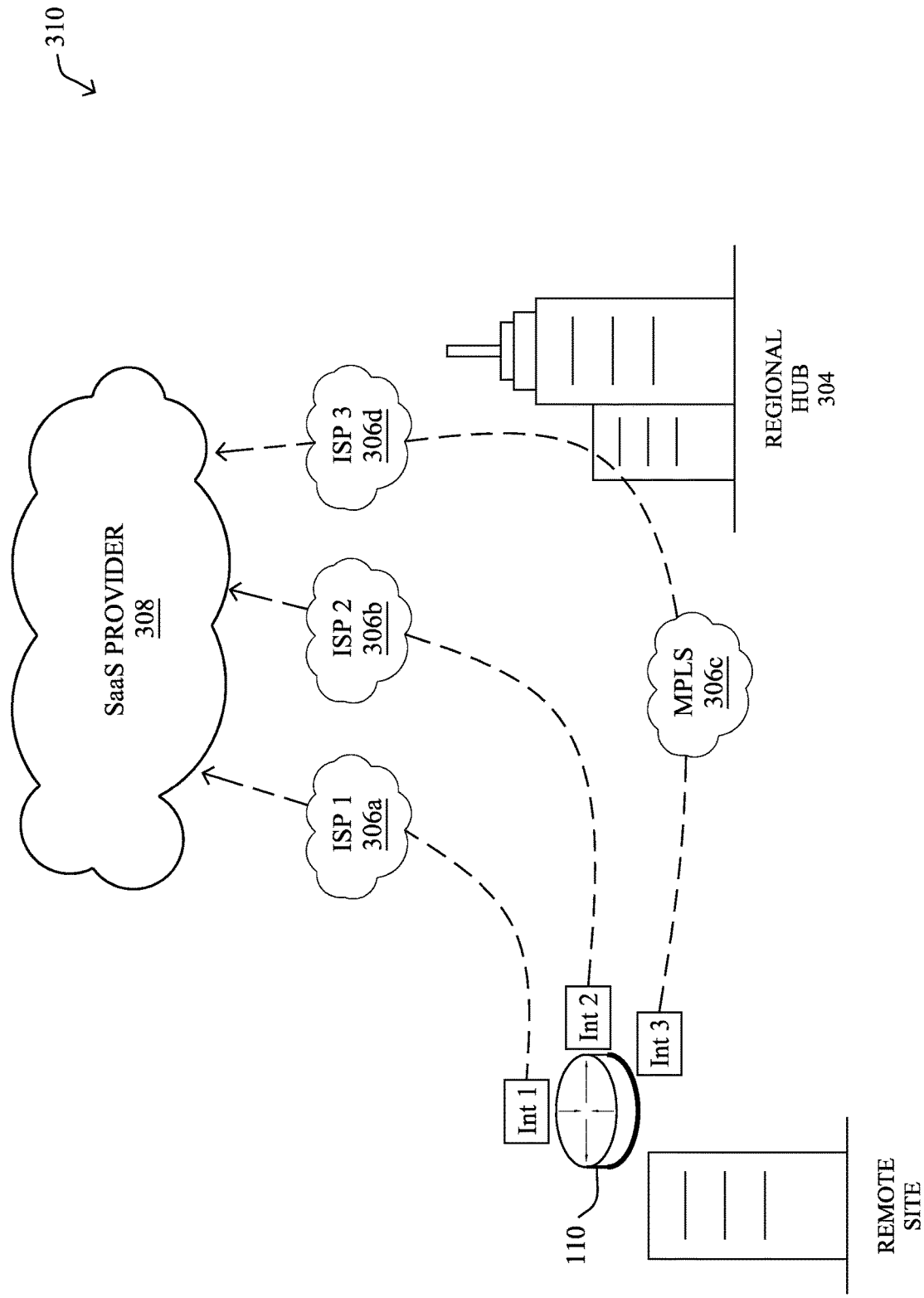

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
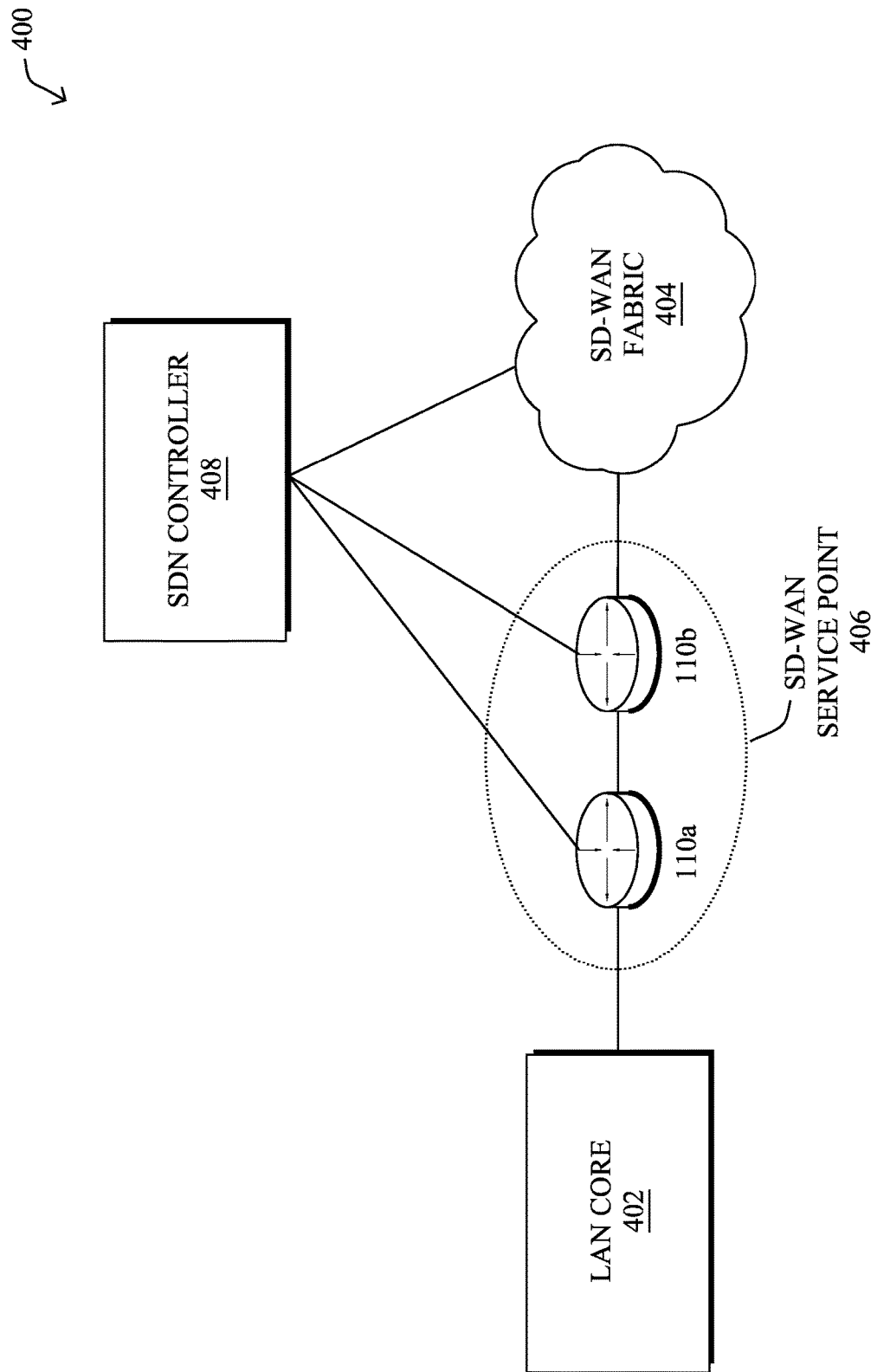
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
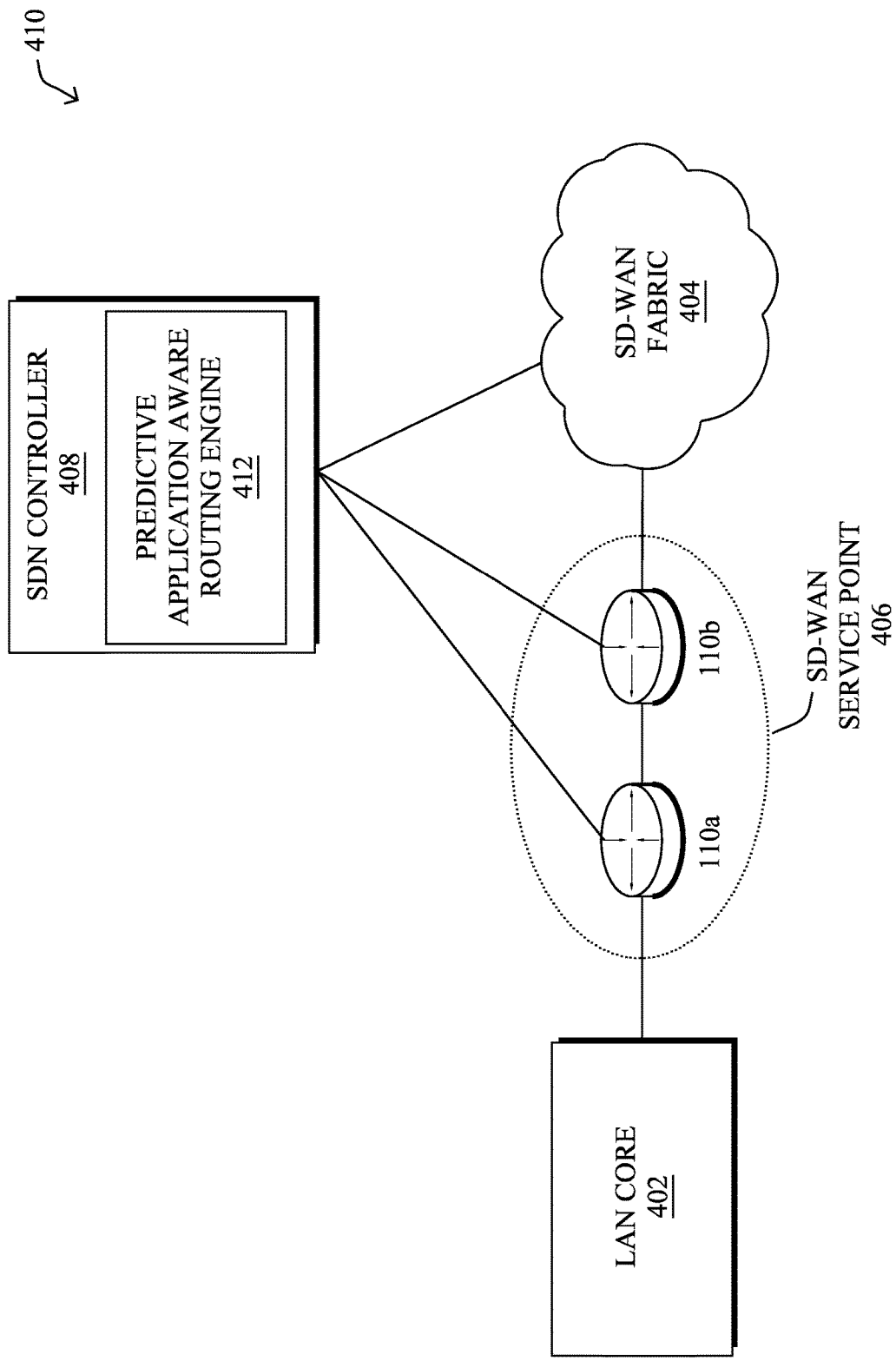

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, the aim of predictive routing systems, such as predictive application aware routing engine 412, is to enable the Internet with the ability to learn thanks to the use of statistical and machine learning model training. Such models can then be used for encoding path characteristics and expected path performances with regards to specific application SLA requirements, QoE metrics, etc. Predictions can also be made with various forecasting horizons, such as by predicting a potential failure a few seconds in advance, several hours in advance, a few weeks ahead, etc.

The choice, design, and optimization of a prediction model is of the utmost importance. However, the quality of the model training data that is used to train the prediction model is also critical, sometimes even more so. Indeed, noisy training data can lead to false positives, leading to unnecessarily rerouting the traffic which can have a non-negligible effect on the user experience, and/or to false negative, meaning that the system failed to predict a path failure.

Input datasets for predictive networking systems, such as predictive application aware routing engine 412 may take a variety of forms. For instance, such telemetry data may be obtained from a variety of telemetry sources such as probes from active systems (e.g., ping, trace route, etc.), Deep Packet Inspection (DPI) such as by a network base application recognition mechanism classifying traffic and provide various traffic related information, Application Response Time (ART) metrics (e.g., tracking TCP state machine, etc.), or even slow Layer-7 feedback mechanisms assessing the user experience for an online application.

Noise is undoubtedly a major source of confusion of machine learning models. Noise in telemetry can be due to incorrect implementation (e.g., bugs), but also sporadic phenomenon leading to incorrect telemetry. For example, a queue along the path may fill up leading to additional delays that would not reflect the property of a path (thus qualified as noise). In addition, the path probing mechanism may itself inject noise (e.g., due to the overhead of the probing systems). Finally, the telemetry data may itself be correct (reflecting path property) but one may want to ignore localized phenomenon that should not be used for training, also considered herein as noise in the learning process.

Thus, the ability of a predictive system to remove noise is crucial so as to extract the real signal and improve the performance of the system. The major difficult consists in removing noise in the system without removing (too much) the useful information in the data.

User-Assisted Training Data Denoising for Predictive Systems

The techniques introduced herein allow for the efficient denoising of datasets used to train machine learning models for predictive routing. In some aspects, time series of path performance metrics may be stored (e.g., in a database) and a series of filters applied, to remove noise. In further aspects, a second mechanism may be used to extract typical filtered patterns of the signal and reported by to a third-party system and/or a user, to assess the quality of such a noise filter. In another aspect, an automated mechanism is introduced that determines whether the filtering removed important signals from the data. For instance, ground truth events of high interest (e.g., application failure) can be used to determine whether such events are correlated with information in the original data that might have been filtered out, inadvertently. In yet another aspect, the techniques herein can also be used to directly assess the impact of a filter on the overall performance of the prediction model using a feedback/optimization loop.

Illustratively, the techniques described herein may be performed by hardware, software, and/or firmware, such as in accordance with data denoising process 249, which may include computer executable instructions executed by the processor 220 (or independent processor of interfaces 210) to perform functions relating to the techniques described herein, e.g., in conjunction with the operations of predictive routing process 248.

Specifically, according to various embodiments, a device receives, via a user interface, an indication of what is considered noise within a time series of a path performance metric. The device selects, based on the indication, a particular denoising filter to be applied to telemetry data obtained from one or more network paths regarding the path performance metric. The device forms model training data by applying the particular denoising filter to telemetry data obtained from one or more network paths regarding the path performance metric. The device trains, using the model training data, a prediction model to predict when a given network path will experience a failure condition.

Figure 5:
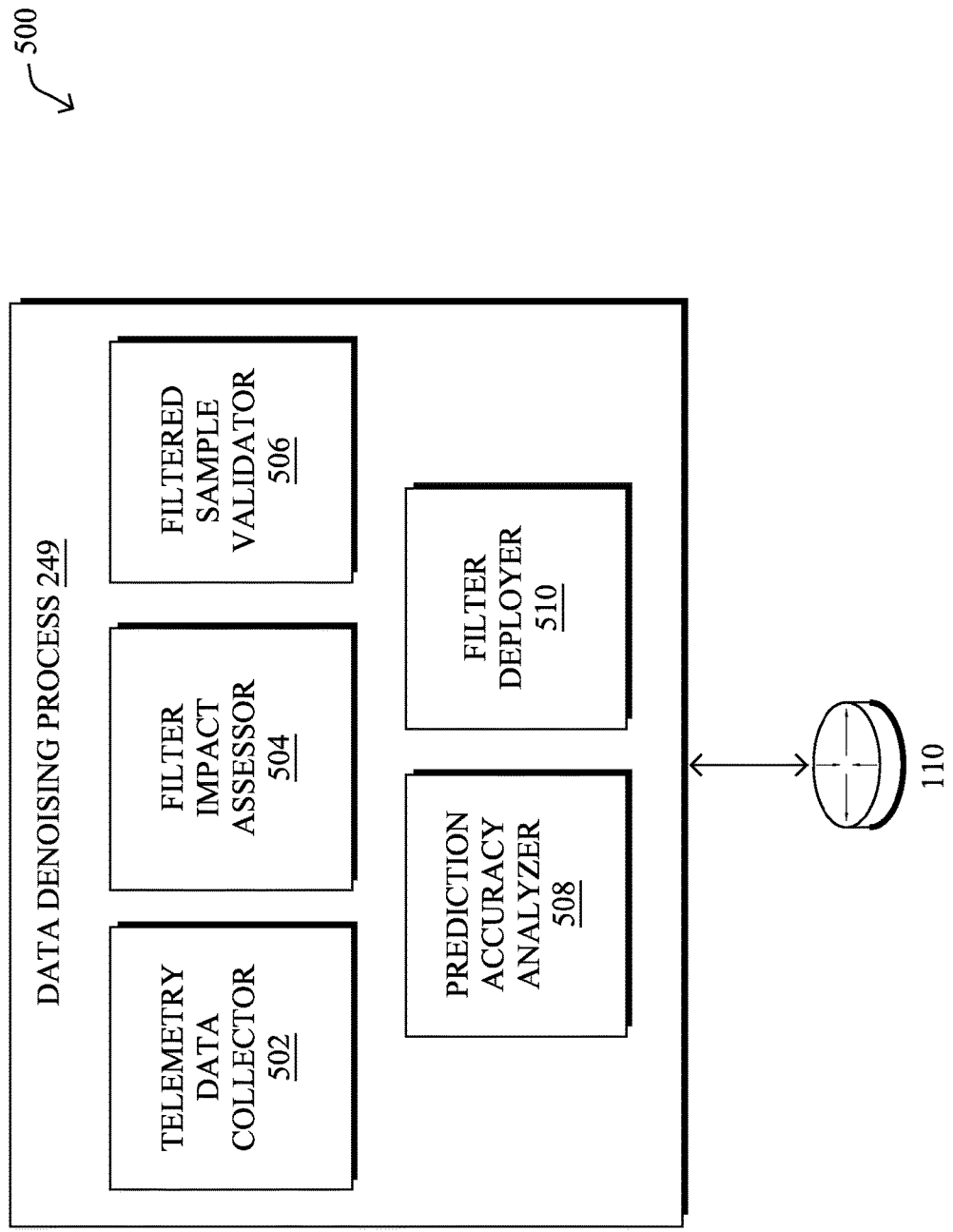
FIG. 5 illustrates an example architecture for distributed predictive routing using lightweight state tracking.

Operationally, FIG. 5 illustrates an example architecture 500 for distributed predictive routing using lightweight state tracking, according to various embodiments. At the core of architecture 500 is data denoising process 249, which may be executed by a controller for a network, a networking device, or another device in communication therewith. For instance, data denoising process 249 may be executed by a controller for a network (e.g., SDN controller 408 in FIGS. 4A-4B), a particular networking device in the network (e.g., a router, etc.), another device or service in communication therewith, or the like. In some embodiments, for instance, data denoising process 249 may be used to implement a predictive application aware routing engine, such as predictive application aware routing engine 412, or another supervisory service for the network. In other embodiments, data denoising process 249 may be used to implement a reactive routing approach in the network.

As shown, data denoising process 249 may include any or all of the following components: a telemetry data collector 502, a filter impact assessor 504, a filtered sample validator 506, a prediction accuracy analyzer 508, and/or a filter deployer 510. As would be appreciated, the functionalities of these components may be combined or omitted, as desired (e.g., implemented as part of predictive routing process 248). In addition, these components may be implemented on a singular device or in a distributed manner, in which case the combination of executing devices can be viewed as their own singular device for purposes of executing data denoising process 249.

During operation, telemetry data collector 502 may be configured to obtain various telemetry data regarding the paths in a network, such as their QoS or other path metrics. In various embodiments, telemetry data collector 502 may obtain such information from a datalake (e.g., a datalake on which predictive routing process 248 operates), from various telemetry sources in the network (e.g., routers, switches, etc.) or may collect such information, directly. For instance, telemetry data collector 502 may collect path telemetry data for a path regarding measured metrics such as loss, latency, jitter, etc., at a given frequency $F_i$ for a period of time $T_i$ along each path of interest $P_i$. This can be done either on a pull basis by sending a request to one or more networking devices for the telemetry data or on a push basis, where the telemetry data is sent to telemetry data collector 502, automatically. In one embodiment, telemetry could be gathered by telemetry data collector 502 using time based telemetry (streaming). In another embodiment, a (more exhaustive) data gathering campaign may be triggered by telemetry data collector 502 to gather a rich set of telemetry variables to a collection of routers in the network.

In yet another embodiment, the techniques herein may be limited to a specific set of paths (paths carrying a given set of (critical) applications, a high volume of traffic, etc.), as configured by a user. In addition, another function of telemetry data collector 502 may be to compute time series from the received path metrics for the various network paths.

If available, telemetry data collector 502 may also obtain telemetry data indicative of user satisfaction scores for a given online application whose traffic is routed via a particular path. For instance, the online application itself may include a mechanism that allows users to rate their satisfaction with the performance of the online application (e.g., rating a videoconference on a scale of 0-5 stars, etc.). In other instances, user satisfaction information can be captured through agents, polling mechanisms (e.g., email, text, etc.), or the like. Regardless, telemetry data collector 502 may access this information via an application programming interface (API) associated with the system responsible for capturing or reporting such information. Telemetry collector 502 may further obtain configuration or other information for the various paths, such as their SLA templates, their path types (e.g., business Internet, MPLS, public Internet, etc.), geographic information, service provider information, etc. In yet other embodiments, the time series may take the form of categorical values, such as labeling the path metric as "good," "bad," etc. every n-number of minutes.

Figure 6A:
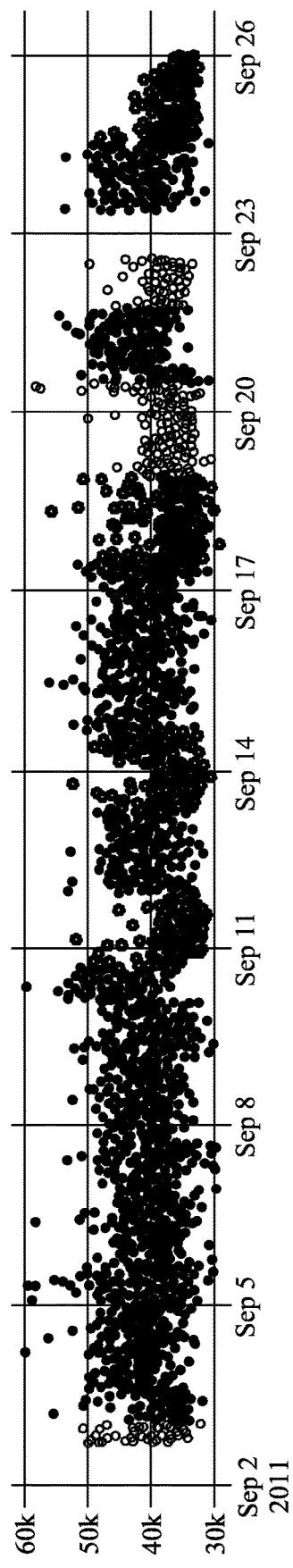
FIGS. 6A-6B illustrate example plots of original and denoised time series data.

Thus, telemetry data collector 502 may be used to collect and store sets of path performance metrics such as delay, loss, jitter, transaction times, etc., potentially on a per-path and/or per-application basis. For instance, FIG. 6A illustrates an example plot 600 of the reported transaction times for a particular SaaS/online application. As shown, different points of presence (PoPs) are used at different times to access the application. From this, it can be seen that the signal to noise ratio is indeed very low, which could lead to very low and lead poor accuracy of the model.

Figure 6B:
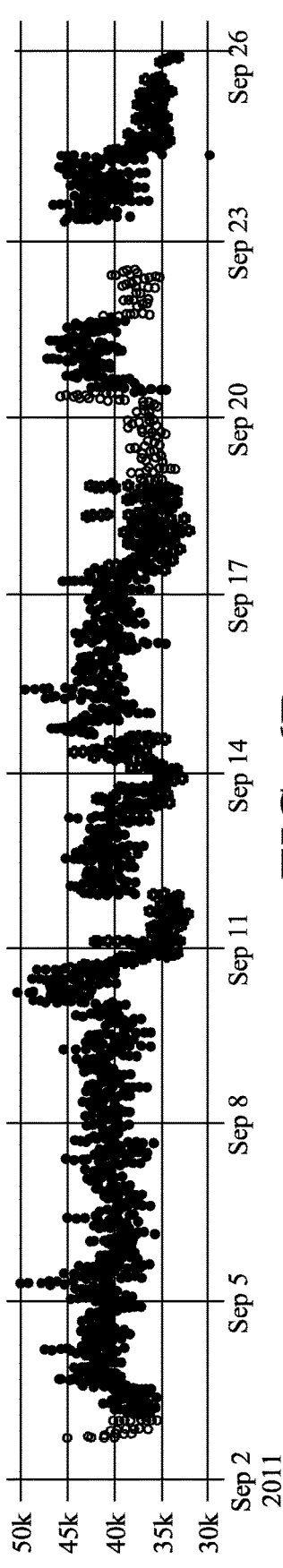

Data denoising process 249 may also include filter impact assessor 504, which is configured to analyze the effect a specific filter would have on the time series, where such effect is measured in terms of impact of forecasting accuracy. Indeed, many existing smoothing functions and filters can be used such as Kalman filter using linear quadratic estimation, wavelet transforms (Daubechies family) or other smoothing functions such as Savitsky-Golay using a mathematical convolution operation with the aim of improving the signal-noise ration without too much signal distortion, to name a few. For instance, FIG. 6B illustrates a plot 610 of the time series that results after applying a Savitsky-Golay filter to the time series depicted in plot 600 in FIG. 6A.

In various embodiments, filter impact assessor 504 may allow a network administrator to specify, via a user interface and potentially for each performance metric and/or telemetry source, what they consider to be noise within the time series. For example, the user may request to keep all measurements of the time series that are above the $n^{th}$ percentile of jitter (or a given value, say, 100 ms) and smoothen the noise at lower ranges. This is usually done if the expert believes that the telemetry is reliable. Or, the user may indicate that all of the jitter values should be smoothed, if they know that the telemetry is prone to noisy measurements. In another embodiment, the user may interact with a graphical user interface or other interface, to manually specify what kind of measurements are considered to be noise (e.g., sudden peaks which lasts for less than few seconds). In turn, filter impact assessor 504 may select the appropriate filtering approach and its parameters, accordingly.

Figure 7:
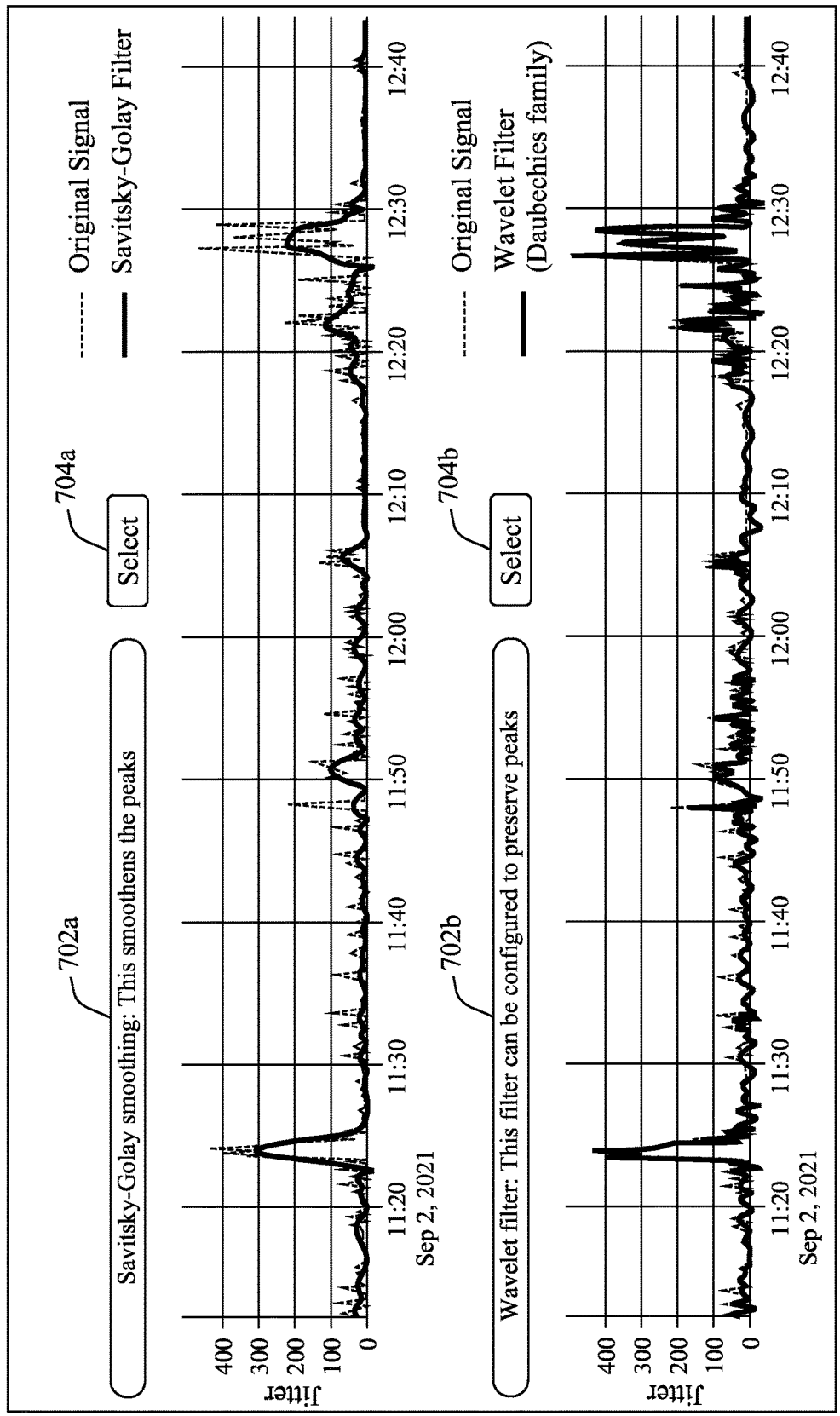
FIG. 7 illustrates an example user interface.

In another embodiment, filter impact assessor 504 may present several sample types of denoising outputs for display to the user interface. The network administrator can then select which of the results best reflects their conception of noise in the data. For instance, FIG. 7 illustrates an example user interface 700 displaying two plots: a first plot 702a that compares the original jitter time series for a path to the results of applying Savitsky-Golay smoothing to that time series, as well as a second plot 702b that compares the original jitter time series to the results of applying a wavelet filter to that time series. User interface 700 may also include input options 704a-704b that allow the user to select which of the filtering options best represents their conception of noise in the original jitter time series. Indeed, the output of Savitsky-Golay filter (with polynomial degree m=15) in plot 702a smoothens all the peaks considered as noise. In contrast, the wavelet filter applied in plot 702b can be configured to preserve peaks above a certain percentile. Moreover, many other parameters can be configured to make sure the actual noise is removed without affecting much of the signal. For example, different family of wavelets, such as Daubechies or Symlets (sym) can be used for wavelets. Since the "noise" and "signal" is dependent on the context, this information is essential to smoothen. In further embodiments, filter impact assessor 504 may also be configured to automatically infer the appropriate type of noise filter to be applied. For example, filter impact assessor 504 may include a learning algorithm that infers that the network administrator prefers wavelet filtering for jitter, but Savitsky-Golay smoothing for latency.

As shown in FIG. 5, data denoising process 249 may also include filtered sample validator 506, which performs the task of automatically validating a filtered sample, in various embodiments. Here, filtered sample validator 506 may allow a third-party system or a user to input a list of typical patterns in their original state, as well as after filtering sing a noise filter Fi. The objective of filtered sample validator 506 is to determine whether a filtered sample is invalid using some form of ground truth from those source(s). For example, consider the case of a time series of the path delay for a path is used by voice traffic, where a filtered form of the data is to be used to train a prediction model. In such a case, filtered sample validator 506 may also obtain feedback from the voice application, such as a mean opinion score (MoS) or other form of ground truth. In such a case, filtered sample validator 506 may assess whether a bad voice quality metric (e.g., a low MoS score) correlates with a spike of the delay metric. If the filtered sample results in losing such a correlation (e.g., when the MoS score drops, the spike in the delay has been filtered), then the filter actually removes important signal that should be used by the predictive model. Such a mechanism allowing for assessing the quality of a filter is critical for scalability reasons.

Prediction accuracy analyzer 508 of data denoising process 249 may be configured to assess the impact of an input filter on the accuracy of the resulting prediction model, according to various embodiments. For instance, assume that the filtered training data that results from filter impact assessor 504 and/or filtered sample validator 506 is used to train a prediction model for use by a predictive routing engine, such as predictive application aware routing engine 412. Here, a failure (e.g., bad application experience) can be defined as a significant degradation of the percentage of time spent outside of a predefined SLA template (e.g., delay <300 ms, jitter <50 ms). If the percentage of time spent outside of the template increases from 2% to 10%, it is known as having a drastic impact on the user experience and satisfaction with the online application. The objective of the prediction model, thus, is to predict such failures and minimize their impact, such as by rerouting the application traffic. In such instances, the false positives, false negatives, etc., can be tracked and used to quantify the accuracy of the prediction model (e.g., its recall, precision, etc.). Such information can then be leveraged by prediction accuracy analyzer 508 as part of a feedback loop, to automatically tune the noise filters according to their impacts on the accuracy of the resulting prediction model.

In one embodiment, prediction accuracy analyzer 508 may assess the impact of a noise filter on the resulting prediction model using AutoML techniques such as grid/random search or hyperopt. For example, one can define a problem which searches through different denoising algorithms and parameters. More specifically, a hyperopt can be configured to choose different family of wavelets (e.g., Haar, Daubechies, Symlets, Gaussian wavelets) and different parameters. An objective function can also be defined such that the minima of the objective function provides the "best" denoising. For example, the negative of precision of detection of a failure (given that the recall is at least greater than 0.2) can be provided as the objective function. The given denoising may then be performed, and the prediction model trained/inferred based on the given denoised input. This will result in choosing the best denoised signal for the objective of achieving a given end task.

It is worth noting that a filter, and associated parameters, may be variable and context dependent. Indeed, the nature of a variable (delay, loss, . . . ) may require specific filters. Thus, such a system may use different filters for different types of variables.

Another potential component of data denoising process 249 is filter deployer 510, which is responsible for deploying noise filters for local execution on premise, according to various embodiments. Indeed, on-premise probing systems (e.g., BFD probes on a router) usually do not apply any local processing results in vast amount of data being reported. For example, there are large networks with tens or even hundreds of thousands of different paths. If the downstream applications would always use the denoised signal, a message can be sent to the thousands of devices to smooth the signal and send it to telemetry data collector 502. For instance, filter deployer 510 may deploy a noise filter to router 110, so that it filters its telemetry data prior to reporting it to telemetry data collector 502. Thus, it may be advantageous to apply such filters on premise so as to report time series that have been locally processed. Note that some smoothing algorithms can apply the filter in real-time and send the data. However, other algorithms, such as Savitsky-Golay, will have to wait for a certain window length (e.g., 5 minutes) so that there is enough data to smooth.

Figure 8:
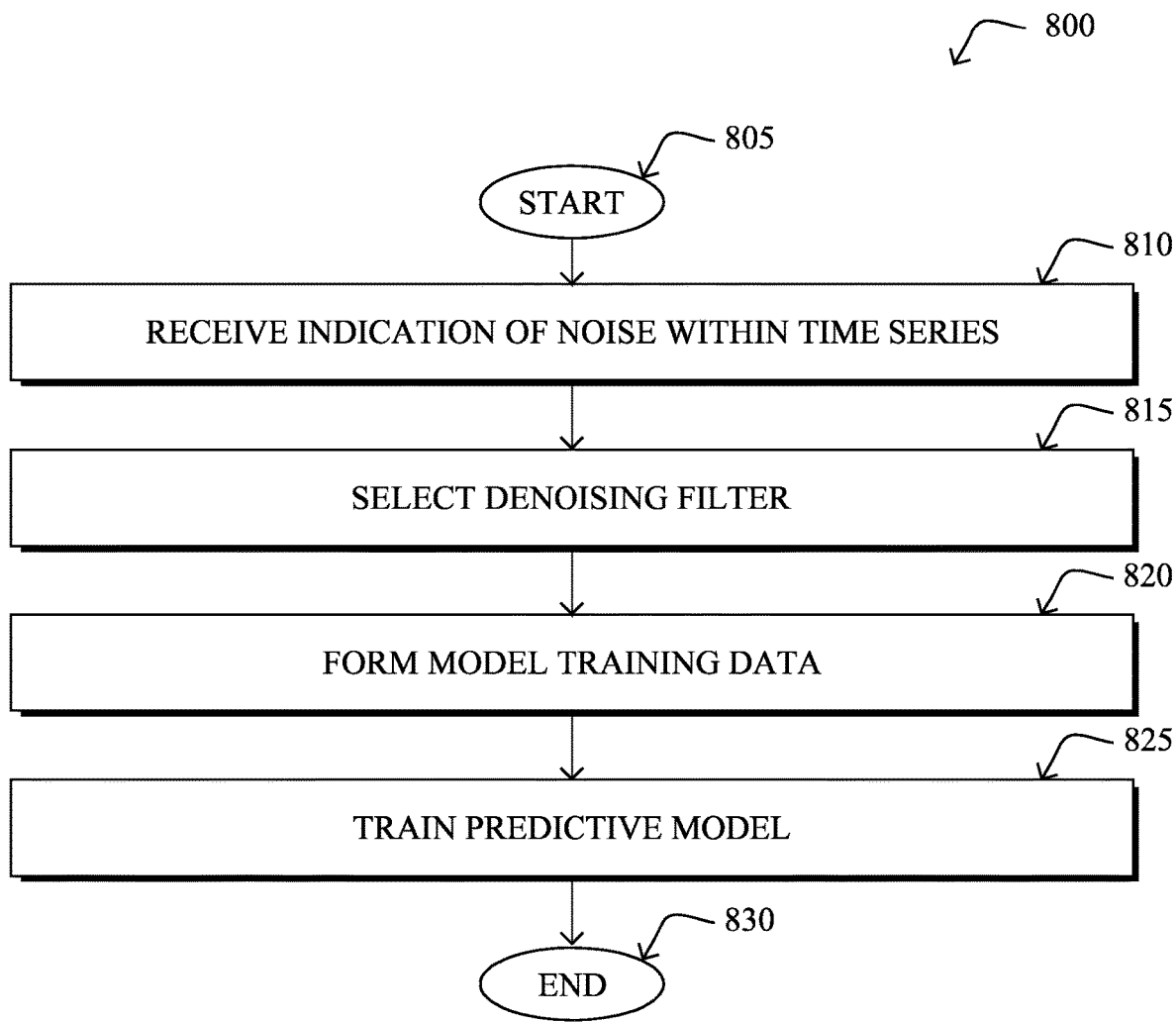
FIG. 8 illustrates an example simplified procedure for user-assisted training data denoising for predictive systems.

FIG. 8 illustrates an example simplified procedure 800 (e.g., a method) for user-assisted training data denoising for predictive systems, in accordance with one or more embodiments described herein. For example, a non-generic, specifically configured device (e.g., device 200), such as controller for a network (e.g., an SDN controller, a cloud-based device, etc.), an edge router, or other device in communication therewith, may perform procedure 800 by executing stored instructions (e.g., data denoising process 249 and/or predictive routing process 248). The procedure 800 may start at step 805, and continues to step 810, where, as described in greater detail above, the device may receive, via a user interface, an indication of what is considered noise within a time series of a path performance metric. In various embodiments, the path performance metric comprises at least one of: jitter, delay, or packet loss. In one embodiment, the indication comprises a selected percentile, and wherein the particular denoising filter is configured to remove measurements of the path performance metric that are below the selected percentile. In another embodiment, the device may receive the indication in part by providing display data to the user interface depicting samples of different denoising filters being applied to the time series, whereby the indication comprises a selection of the particular denoising filter.

At step 815, as detailed above, the device may select, based on the indication, a particular denoising filter to be applied to telemetry data obtained from one or more network paths regarding the path performance metric. In various embodiments, the particular denoising filter comprises a wavelet filter or a Savitsky-Golay filter.

At step 820, the device may form model training data by applying the particular denoising filter to telemetry data obtained from one or more network paths regarding the path performance metric, as described in greater detail above. In some embodiments, the device may do so by causing one or more networking devices associated with the one or more network paths to apply the particular denoising filter to the telemetry data obtained from the one or more network paths regarding the path performance metric.

At step 825, as detailed above, the device may train, using the model training data, a prediction model to predict when a given network path will experience a failure condition. Such a prediction model may be used, for instance, to reroute network traffic prior to a predicted failure condition. In some embodiments, the failure condition of the given network path comprises a service level agreement (SLA) violation or decrease in an application experience metric. In one embodiment, prior to training the prediction model, the device may determine whether the model training data is invalid based in part on quality of experience metrics associated with an online application accessed via the one or more network paths from which the telemetry data was obtained. In one embodiment, the device may also initiate an adjustment to the particular denoising filter, based on a prediction performance metric for the prediction model. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for user-assisted training data denoising for predictive systems, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
receiving, at a device and via a user interface, an indication of what is considered noise within a time series of a path performance metric;
selecting, by the device and based on the indication, a particular denoising filter to be applied to telemetry data obtained from one or more network paths regarding the path performance metric;
forming, by the device, model training data by applying the particular denoising filter to telemetry data obtained from one or more network paths regarding the path performance metric; and
training, by the device and using the model training data, a prediction model to predict when a given network path will experience a failure condition.

2. The method as in claim 1, wherein the failure condition of the given network path comprises a service level agreement (SLA) violation or decrease in an application experience metric.

3. The method as in claim 1, wherein the path performance metric comprises at least one of: jitter, delay, or packet loss.

4. The method as in claim 1, wherein the indication comprises a selected percentile, and wherein the particular denoising filter is configured to remove measurements of the path performance metric that are below the selected percentile.

5. The method as in claim 1, wherein receiving the indication of what is considered noise comprises:
providing, by the device, display data to the user interface depicting samples of different denoising filters being applied to the time series, wherein the indication comprises a selection of the particular denoising filter.

6. The method as in claim 1, wherein the particular denoising filter comprises a wavelet filter or a Savitsky-Golay filter.

7. The method as in claim 1, further comprising:
determining, prior to training the prediction model, whether the model training data is invalid based in part on quality of experience metrics associated with an online application accessed via the one or more network paths from which the telemetry data was obtained.

8. The method as in claim 1, wherein forming the model training data comprises:
causing one or more networking devices associated with the one or more network paths to apply the particular denoising filter to the telemetry data obtained from the one or more network paths regarding the path performance metric.

9. The method as in claim 1, further comprising:
initiating, by device, an adjustment to the particular denoising filter, based on a prediction performance metric for the prediction model.

10. The method as in claim 1, wherein the prediction model is used to reroute network traffic prior to a predicted failure condition.

11. An apparatus, comprising:
one or more network interfaces;
a processor coupled to the one or more network interfaces and configured to execute one or more processes; and
a memory configured to store a process that is executable by the processor, the process when executed configured to:
receive, via a user interface, an indication of what is considered noise within a time series of a path performance metric;
select, based on the indication, a particular denoising filter to be applied to telemetry data obtained from one or more network paths regarding the path performance metric;
form, by applying the particular denoising filter to telemetry data obtained from one or more network paths regarding the path performance metric, model training data; and
train, using the model training data, a prediction model to predict when a given network path will experience a failure condition.

12. The apparatus as in claim 11, wherein the failure condition of the given network path comprises a service level agreement (SLA) violation or decrease in an application experience metric.

13. The apparatus as in claim 11, wherein the path performance metric comprises at least one of: jitter, delay, or packet loss.

14. The apparatus as in claim 11, wherein the indication comprises a selected percentile, and wherein the particular denoising filter is configured to remove measurements of the path performance metric that are below the selected percentile.

15. The apparatus as in claim 11, wherein the apparatus receives the indication of what is considered noise by:
providing display data to the user interface depicting samples of different denoising filters being applied to the time series, wherein the indication comprises a selection of the particular denoising filter.

16. The apparatus as in claim 11, wherein the particular denoising filter comprises a wavelet filter or a Savitsky-Golay filter.

17. The apparatus as in claim 11, wherein the process when executed is further configured to:
determine, prior to training the prediction model, whether the model training data is invalid based in part on quality of experience metrics associated with an online application accessed via the one or more network paths from which the telemetry data was obtained.

18. The apparatus as in claim 11, wherein the apparatus forms the model training data by:
causing one or more networking devices associated with the one or more network paths to apply the particular denoising filter to the telemetry data obtained from the one or more network paths regarding the path performance metric.

19. The apparatus as in claim 11, wherein the process when executed is further configured to:
initiate an adjustment to the particular denoising filter, based on a prediction performance metric for the prediction model.

20. A tangible, non-transitory, computer-readable medium storing program instructions that cause a device to execute a process comprising:
receiving, at the device and via a user interface, an indication of what is considered noise within a time series of a path performance metric;
selecting, by the device and based on the indication, a particular denoising filter to be applied to telemetry data obtained from one or more network paths regarding the path performance metric;
forming, by the device, model training data by applying the particular denoising filter to telemetry data obtained from one or more network paths regarding the path performance metric; and
training, by the device and using the model training data, a prediction model to predict when a given network path will experience a failure condition.

* * * * *